April 23, 1968 R. L. JENKINS ET AL 3,379,978
COMBINATION AGC DELAY AND BFO DISABLING CIRCUIT FOR RADIO RECEIVER
Filed Dec. 10, 1964
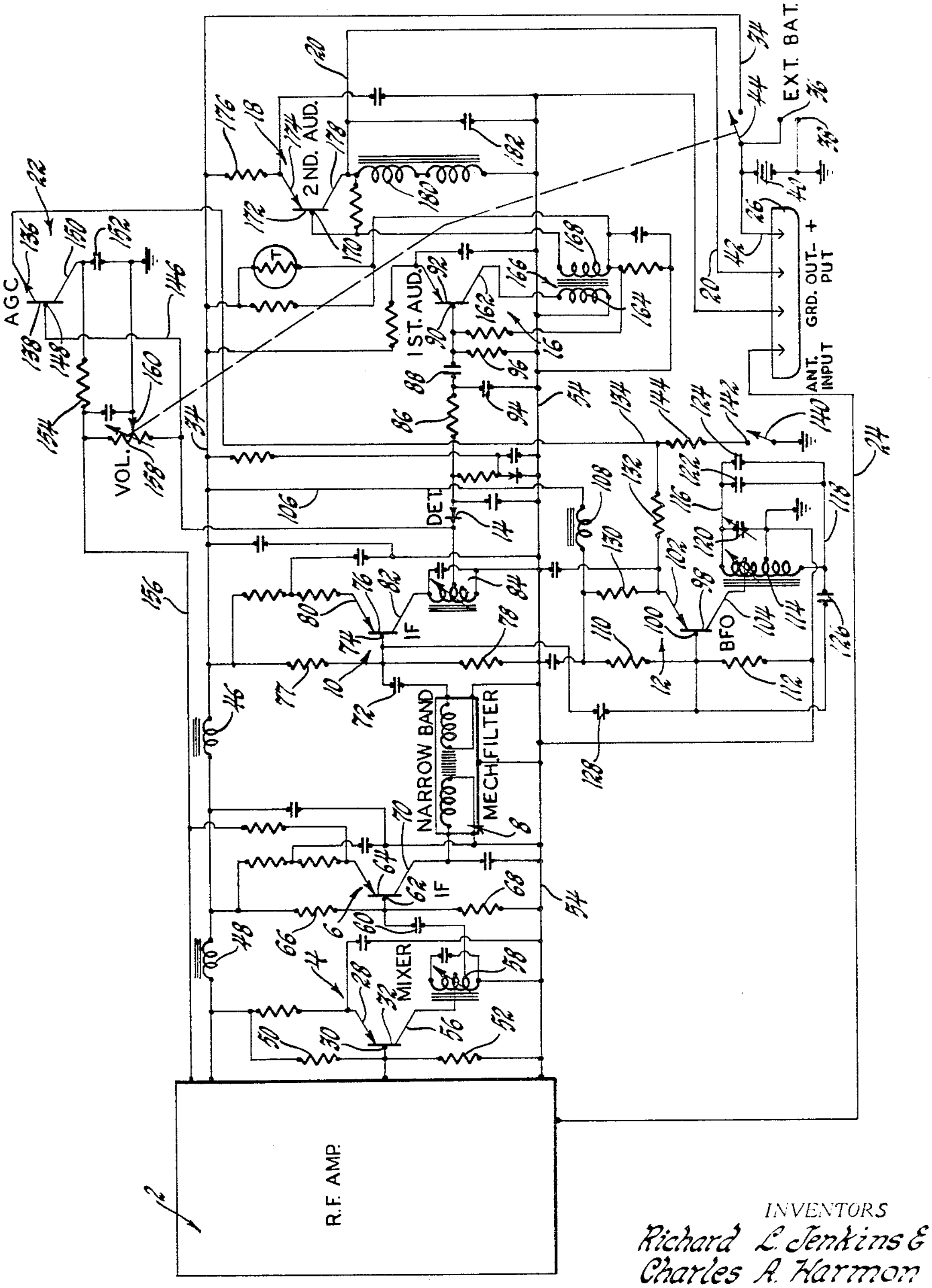
INVENTORS
Richard L. Jenkins &
Charles A. Harmon
Robert E. Fowler
ATTORNEY 3,379,978

COMBINATION AGC DELAY AND BFO DISABLING CIRCUIT FOR RADIO RECEIVER

Richard L. Jenkins and Charles A. Harmon, Kokomo, Ind., assignors to General Motors Corporation, Detroit, Mich., a corporation of Delaware Filed Dec. 10, 1964, Ser. No. 417,427
3 Claims. (Cl. 325—399)

ABSTRACT OF THE DISCLOSURE

A radio receiver adapted for coded CW or voice signal reception. Selection is made by a switch which oppositely affects a beat frequency oscillator and an AGC circuit.

This invention relates to radio receiving apparatus and more particularly to radio receiving circuitry providing unitary automatic gain control delay and beat frequency oscillator control means.

There is currently available radio receiving apparatus for receiving either voice signals or coded continuous wave (CW) signals. In this type of apparatus, which is usually used by amateurs or military personnel, the receiver can be used as an ordinary receiver for audio voice reception or it can be used for coded pulse signals for longer distances.

In coded CW use a beat frequency oscillator is necessary to provide a locally generated frequency to beat with an incoming wave developing therewith an audible tone which is then read as a pulse for Morse code work. The beat frequency oscillator is only used when the receiver is being used for CW work and is disabled when the receiver is switched to normal voice reception. Also for voice reception most receivers have an automatic gain or automatic volume control section which is utilized to maintain a substantially constant audio output regardless of fluctuations in signal strength and this section cannot be used when the set is receiving CW.

It is an object in making this invention to provide a radio receiving system having a simplified unitary circuit for controlling the AGC delay and the beat frequency oscillator.

It is a further object in making this invention to provide a simplified AGC and beat frequency oscillator control circuit in which a minimum number of components are utilized and in which some serve in dual capacities.

With these and other objects in view which will become apparent as the specification proceeds, our invention will be best understood by reference to the following specification and claims and the illustrations in the accompanying drawings, in which:

The figure is a circuit diagram of a radio receiver embodying our invention.

Referring now more particularly to the figure, there is shown therein radio receiving apparatus including an RF amplifying stage 2, the output of which is fed directly into a mixer stage 4 followed by the first IF amplifier stage 6. The output of the first IF stage is fed through a narrow band mechanical filter 8 and then into the input of the second IF amplifier 10 for further amplification. A beat frequency oscillator 12 for generating a local frequency also feeds into the input of the second IF amplifier 10 and the output of this stage is detected by diode 14 acting as a detector. The detected audio signal is amplified in the first amplifier stage 16 and then in a second amplifier stage 18 and this final audio signal is fed out of the output line 20 to a loudspeaker, not shown. The gain of the system is controlled by the AGC stage 22.

As previously mentioned this type of receiver is capable of receiving either voice signals or coded CW signals. The signals are intercepted by an antenna and fed into the antenna input which appears on line 24 from the termial board 26 and extends to the RF amplifier 2. The output of the RF amplifier 2 is applied across the emitter 28 and base 30 of the transistor 32 of the mixer stage 4. Power for the receiver is provided by power line 34 for either an external battery across terminals 36–38 or battery 40 or applied to line 42 from the terminal board. An On-Off switch arm 44 controls the application of power to the power line 34. Power line 34 extends to a choke 46 which is connected in series with a second choke 48 to keep the high frequency currents from the power source. Biasing resistors 50 and 52 are connected in series across the power line to ground line 54 and provide the proper potential for the base and emitter electrodes of transistor 32.

The output of the mixer stage 4 is taken across the collector 56 and applied through tuned coupling circuit 58 and a coupling capacitor 60 to the base 62 of the IF transistor 64. A potential divider formed of series resistors 66 and 68 connected across between the power line 34 and ground 54 provide the potential for the base and emitter electrodes. The output of the IF stage 6 is taken from the collector 70 and applied to the narrow band mechanical filter 8 and the output therefrom applied through a coupling condenser 72 to the base electrode 74 of the transistor 76 of the second IF amplifier stage. A potential divider consisting of two resistances 77 and 78 in series are connected between the power line 34 and ground line 54 to apply the proper potential to the base 74 and to the emitter 80. The output from the IF stage is delivered from the collector 82 of transistor 76 through tuned circuit 84 to the detector diode 14 where it is detected and then applied through series resistor 86 and coupling condenser 88 to the base 90 of the first audio amplifying transistor 92. This signal is filtered by condenser 94 and by the series resistance 86.

When the set is operated for CW reception it is necessary to generate a local beat frequency and this is provided by the beat frequency oscillator 12 which includes a transistor 98 having a base 100, an emitter 102 and a collector 104. The proper potentials are provided for this transistor through tie line 106 which is connected to power line 34 and extends to a filter choke 108 and thence through a potential divider consisting of resistances 110 and 112 in series to ground. This provides the proper potential for the emitter 102 and for the base 100. The collector 104 of the transistor 98 is connected to a tap on inductance 114 one end of which is connected to line 116 and the opposite end to line 118. A tap on inductance 114 is grounded. A variable condenser 120 is connected in shunt to the upper half of the inductance 114 which is also variable. This, therefore, provides a tuned circuit for determining the frequency of oscillation of this stage. Two condensers 122 and 124 are connected in parallel across the main inductance 114. Condenser 126 is connected between line 118 and the base 100 to provide a feedback path for the oscillator to maintain it in operation. A coupling condenser 128 is connected between the base 100 of transistor 98 and base 74 of transistor 76 for coupling the output of the beat frequency oscillator into the IF amplifier stage in order to mix the signal with the incoming CW signal to provide the audible beat.

A resistor 130 is connected from a point intermediate resistor 110 and filter choke 108 to emitter electrode 102. A resistor 132 is connected from the emitter 102 to tie line 134 which extends to the emitter 136 of AGC transistor 138. Movable switch arm 140 is grounded and forms a part of a gang switch which is moved when the set is adjusted for either CW or normal voice operation. Stationary contact 142 of this switch is directly connected to resistance 144 whose opposite terminal is connected to line 134. When switch 140–142 is open the set is adjusted to receive CW signals and when closed, voice signals by applying a delay to the AGC action and disabling the BFO circuit. The input for the AGC stage is provided through line 146 which extends from a point between the detector diode 14 and the output of transistor 76 and base 148 of the AGC transistor 138. The collector 150 of the transistor 138 is connected to ground through bypass condenser 152 and also through resistor 154 to the feedback line 156 to the RF amplifier for controlling the gain of the receiver. A variable resistor 158 is connected to line 156 and has a movable tap 160 thereon which is directly connected to ground. This adjustable tap acts as a volume control by determining the gain of the reeciver. It is ganged to work with the On-Off switch and is a combination on-off and volume control as is conventional. This connection is shown by the dash line between the two elements.

The output of the first audio amplifier stage is taken from collector 162 of transistor 92 which is connected to the primary winding 164 of an audio coupling transformer 166, the secondary winding 168 of which has one terminal connected directly to the base 170 of the second audio amplifier stage including transistor 172. The emitter 174 of this transistor is connected directly to the power line 34 through limiting resistor 176. The output from this stage is fed from collector 178 of transistor 172 to output line 20 directly connected thereto. A filter circuit including inductance 180 and condenser 182 is connected between the collector and ground.

The operation of the receiver is as follows. With the On-Off switch 44 closed and the proper potentials applied to the receiver and the same adjusted for receiving code signals the switch 140–142 is open. This disables the AGC stage by breaking the circuit from the emitter 136 to ground. No current flows through resistances 132 or 144 with code reception. The BFO oscillator is in operation feeding continuous high frequency into the base 74 of the second IF stage 10 and with each pulse which is fed to this stage from the previous stages an audible signal is heard in the loudspeaker which is read in code. When adjustments are made to convert from the CW type of operation to voice reception the switch 140–142 is closed. This completes the ground circuit for the AGC stage from the emitter 136 through resistor 144 to ground and disables the beat frequency oscillator stage 12 by biasing the emitter 102. The AGC delay is provided by the voltage divider consisting of resistors 130, 132 and 144. This same network drops the emitter 102 potential low enough to reverse bias the base-emitter diode of transistor 98 thus disabling the BFO stage.

By the use of these simple components therefore, the set is able to convert from the CW operation to normal voice operation and reverse with a minimum number of components and simple operation.

What is claimed is:

1. In radio receiving apparatus having radio frequency amplifying means mixing means and IF amplifier means to which either continuous wave pulses or amplitude modulated carrier waves are applied; detector means connected thereto to detect signals from the IF amplifying means, audio frequency amplifying means connected to the detector means to accept detected signals and producing an audio frequency output or pulses, a beat frequency oscillator connected to the input of the IF amplifying means, automatic gain control means connected to the detector means and to the input of the radio frequency amplifying means to regulate the output of the apparatus as the input signal strength varies, a source of electrical power, biasing means for the automatic gain control means and the beat frequency oscillator connected to the source of electrical power, a single switching means in said last mentioned connection so that when in one position the automatic gain control is properly biased and active and the beat frequency oscillator is deenergized, and when in the opposite position the automatic gain control is inoperative and the beat frequency oscillator operative to supply locally generated waves for continuous wave operation.

2. In a radio receiver capable of receiving and translating either continuous wave pulses or AM carrier waves and having radio frequency amplifying means, detecting means, audio frequency amplifying means, automatic gain control means and a beat frequency oscillator, a common control for the beat frequency oscillator and the automatic gain control means comprising a source of electrical power, common biasing means for the beat frequency oscillator and the automatic gain control means connected to the beat frequency oscillator, the automatic gain control means and the source of electrical power and switching means in the common biasing means to simultaneously de-energize the automatic gain control means and energize the beat frequency oscillator and vice versa by changing the position of the switch.

3. In a radio receiver capable of receiving and translating either continuous wave pulses or AM carrier waves and having radio frequency amplifying means, detecting means, audio frequency amplifying means, automatic gain control means including a first transistor having a base, emitter and collector and a beat frequency oscillator including a second transistor having a base, emitter and collector, a common control for the beat frequency oscillator and the automatic gain control means comprising a source of electrical power, a voltage divider formed of a plurality of resistors connected across said source of electrical power and selected points therein being connected respectively to the emitter of the first and to the emitter of the second transistors to bias the same, and swiching means in series with the voltage divider to open the circuit and control the energization of the automatic gain control means and the beat frequency oscillator so that they are alternately operable.

References Cited

UNITED STATES PATENTS 3,275,939 9/1966 Luftig ............ 325—399

KATHLEEN H. CLAFFY, *Primary Examiner.*

R. LINN, *Assistant Examiner.*